United States Patent Office 3,277,144
Patented Oct. 4, 1966

3,277,144
3-(N-ACYL-N-METHYL) - AMINO - 1 - HYDROCARBONSULFONOXY PROPANE COMPOUNDS AND METHOD OF PREPARATION
Max Tishler, Westfield, John M. Chemerda, Metuchen, and Janos Kollonitsch, Westfield, N.J., assignors to Merck & Co., Inc., Rahway, N.J., a corporation of New Jersey
No Drawing. Continuation of application Ser. No. 207,405, July 3, 1962. This application Nov. 18, 1963, Ser. No. 340,576
3 Claims. (Cl. 260—456)

This invention relates to a process for the production of 5H-dibenzo[a,d]cycloheptenes. In particular, the invention relates to the preparation of 5H-dibenzo[a,d]cycloheptenes which are substituted at the 5-position with a secondary aminopropyl. More particularly, the invention is concerned with the preparation of 5-(3-methylaminopropyl)-5H-dibenzo[a,d]cycloheptene. The invention also relates to novel compounds utilized in the process and their preparation.

This application is a division of our copending application Serial No. 207,405, filed July 3, 1962.

In accordance with the process of the present invention, an alkali metal derivative of 5H-dibenzo[a,d]cycloheptene is reacted with a 3-(N-acyl-N-methyl)-amino-1-hydrocarbonsulfonyloxypropane and the resulting 5-[3-(N-acyl - N - methyl)-aminopropyl]-5H-dibenzo[a,d]cycloheptene hydrolyzed to form the desired product. This process may be illustrated as follows:

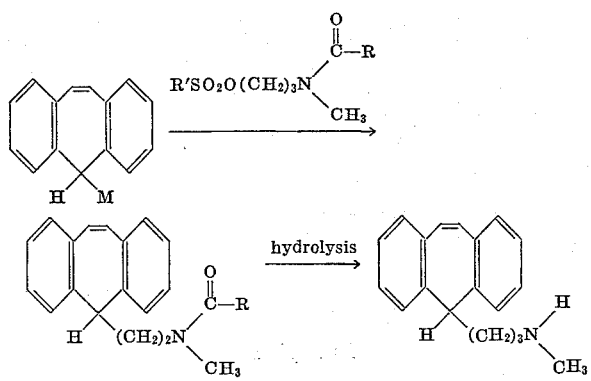

wherein M represents an alkali metal such as sodium, potassium or lithium; R is a radical selected from the group consisting of hydrogen, alkyl, cycloalkyl, aralkyl and aryl and R' is a hydrocarbon radical such as alkyl, cycloalkyl, aralkyl and aryl. The compounds may also have substituents on one or both of the benzenoid rings and/or on the propyl chain. It will be readily apparent to those skilled in the art that inasmuch as the R and R' groups are removed during the process, it is not critical which particular group is utilized to form the 3-(N-acyl-N - methyl)-amino-1-hydrocarbonsulfonyloxypropane or intermediate acid amide and the choice thereof is subject only to the limitations of ease of hydrolysis and other practical and economical considerations. However, the preferred groups in each instance are alkyl and aryl.

The starting compound, namely, the alkali metal derivative of 5H-dibenzo[a,d]cycloheptene may be readily prepared by reacting 5H-dibenzo[a,d]cycloheptene with a metalating reagent such as, for example, sodium amide, potassium amide, phenylsodium, butyllithium and the like. The sodium and potassium derivatives may be prepared using the process described by Villani, J. Med. and Pharm. Chem. 5, pp. 373-382 (1962). Lithium derivative may be prepared in analogous manner using butyllithium.

The 3 - (N-acyl-N-methyl)-amino-1-hydrocarbon-sulfonyloxypropanes may be prepared by reacting 3-methylaminopropanol-1 with an acid amide to form the corresponding 3-(N-acyl-N-methyl)-aminopropanol-1 and then converting this to the sulfonyloxy derivatives by treatment with a hydrocarbonsulfonyl halide. This may be illustrated as follows:

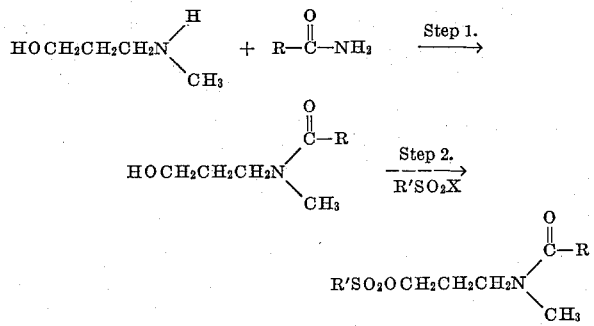

wherein X is a halogen, preferably chlorine or bromine and R and R' are as previously defined. However, as pointed out hereinabove, although R and R' are preferably alkyl or aryl radicals, it is not critical which particular groups, which may be similar or dissimilar, are utilized to form the halide reactant since these groups are subsequently removed during the process.

The reaction (Step 1) is suitably carried out in the presence of an inert, substantially organic solvent. However, in the case of formamide (i.e., where R=H) which is a liquid or other of the amides which melt at elevated temperatures, a solvent is not necessary since the amide can be utilized as such. The choice of solvent, when employed, is not critical and a wide variety can be utilized. Representative of these are ethyleneglycoldimethylether, diethyleneglycoldimethylether, dioxane and propyleneglycoldiethylether. The temperature at which the reaction is carried out is not critical. The reaction may be carried out at elevated temperatures and preferably at the reflux temperature of the system. Likewise, the ratio of reactants is not critical and equimolar amounts may be used although it is preferred to employ an excess of the acid amide. After completion of the reaction, the solvent is removed and the desired product recovered. Further purification of the product can be achieved by fractional distillation under vacuum.

Conversion (Step 2) of the 3-(N-acyl-N-methyl)-aminopropanol-1 to the sulfonyloxypropane derivative is accomplished using an appropriate hydrocarbon sulfonyl halide such as methanesulfonyl chloride, benzenesulfonyl chloride, p-toluenesulfonyl chloride, benzylsulfonyl chloride and the like. The reaction is suitably carried out in the presence of an inert, substantially anhydrous organic solvent. The choice of solvent is not critical and suitable solvents for the reaction include the tertiary amines such as pyridine, dimethylamiline, triethylamine, picoline, quinoline and the like. The temperature at which the reaction is carried out is not critical. The reaction may be carried out at room temperature or at elevated temperatures. However, in certain instances the reaction may be highly exothermic and therefore it is desirable to maintain the temperature below about 100° C. Likewise, the ratio of reactants is not critical and equimolar amounts may be used. It is preferred to employ an excess of the tertiary amine. After completion of the reaction, the solvent is removed and the desired product recovered. Further purification of the product can be achieved by fractional distillation under vacuum.

The reaction between the alkali metal derivative of 5H-dibenzo[a,d]cycloheptene and the 3-(N-acyl-N-methyl)-amino-1-hydrocarbonsulfonyloxypropane is carried out in an inert, substantially anhydrous organic solvent. The choice of solvent is not critical. Suitable solvents include the aromatic hydrocarbons such as benzene, toluene and the like; aliphatic hydrocarbons such as heptene, hexane and the like; ethers such as diethylether, diamylether and the like. Equimolar amounts of reactants are preferably employed and the reaction proceeds at room temperature. However, the temperature is not critical and elevated temperatures up to the reflux temperature of the system may be used. After completion of the reaction, the solvent is removed and the acid amide derivative recovered. Further purification can be achieved by fractional distillation under vacuum.

Conversion to the 5 - (3 - methylaminopropyl)-5H-dibenzo[a,d]cycloheptene is accomplished by hydrolyzing the acid amide derivative. While this may be carried out under either acidic or basic conditions, employing alcoholic solutions of potassium hydroxide, sodium hydroxide, hydrochloric acid, acetic acid and the like as the hydrolyzing medium, the hydrolysis is preferably conducted under basic conditions.

The end compound, namely, 4-(3-methylaminopropyl)-5H-dibenzo[a,d]cycloheptene, prepared by the process of the present invention, is useful in the treatment of mental health conditions as it is an antidepressant and serves as a mood elevator or a psychic energizer. For this purpose, the daily dosage is within the range of 5–250 mg., preferably taken in divided amounts over the day.

The following examples are given for purposes of illustrating the present invention and are not to be construed as limiting the invention.

*Example 1.—Preparation of 3-(N-formyl-N-methyl)-aminopropanol-1*

A mixture of 40 g. of 3-methylaminopropanol-1 and 20 g. of formamide is heated while stirring for 4 hours at 165° C. The crude product is fractionated in vacuo using a Widmer column yielding substantially pure 3-(N-formyl-N-methyl)-aminopropanol-1.

*Example 2*

Following the procedure of Example 1 and employing acetamide, propionamide, butyramide, benzamide and phenylacetamide in place of formamide, there is obtained 3-(N-acetyl-N-methyl)-aminopropanol-1, 3-(N-propionyl-N - methyl) - aminopropanol-1, 3-(N-butyryl-N-methyl)-aminopropanol-1, 3-(N-benzoyl-N-methyl) - aminopropanol-1 and 3-(N-phenylacetyl-N-methyl)-aminopropanol-1, respectively.

*Example 3.—Preparation of 3-(N-formyl-N-methyl)-amino-1-methanesulfonyloxypropane*

1 mole of 3-(N-formyl-N-methyl)-aminopropanol-1 is dissolved in 250 ml. of pyridine. While cooling, 1 mole of methanesulfonyl chloride is added slowly with stirring. After standing overnight at room temperature, the mixture is poured onto crushed ice and then extracted with benzene. The benzene solution is washed free of pyridine with dilute sulfuric acid, then washed neutral with sodium bicarbonate solution and then with water and dried over magnesium sulfate. Evaporation of the benzene solution in vacuo yields substantially pure 3-(N-formyl-N-methyl)-amino-1-methanesulfonyloxypropane.

*Example 4*

Following the procedure of Example 3 and employing 3-(N-acetyl-N-methyl)-aminopropanol-1, 3 - (N-benzoyl-N-methyl)-aminopropanol-1 and 3-(N-phenylacetyl-N-methyl)-aminopropanol-1 in place of 3-(N-formyl-N-methyl)-aminopropanol-1, there is obtained the corresponding sulfonyloxypropane derivative.

*Example 5.—Preparation of 5-[3-(N-formyl-N-methyl)-aminopropyl]-5H-dibenzo[a,d]cycloheptene*

To a suspension of 3.9 g. of potassium amide is slowly added a solution of 19.2 g. (0.1 mole) of 5H-dibenzo[a,d]cycloheptene in 600 ml. of ether with stirring. The suspension is refluxed with stirring for 3 hours, then cooled to room temperature and a solution of 0.1 mole of 3-(N-formyl-N-methyl)-amino-1-methanesulfonyloxypropane in 100 ml. of ether added. The mixture is then refluxed with stirring for 5 hours and then 100 ml. of water added. The ether layer is then washed with dilute hydrochloric acid, then water and then dried over magnesium sulfate and evaporated to dryness yielding 5-[3-(N-formyl-N-methyl)-aminopropyl]-5H-dibenzo[a,d]cycloheptene.

*Example 6*

Following the procedure of Example 5 and employing equivalent quantities of 3-(N-acetyl-N-methyl)-amino-1-methanesulfonyloxypropane, 3-(N-benzoyl - N - methyl)-amino-1-methanesulfonyloxypropane and 3-(N-phenylacetyl-N-methyl)-amino-1-methanesulfonyloxypropane in place of 3-(N-formyl-N-methyl)-amino-1-methanesulfonyloxypropane there is obtained, respectively, 5-[3-N-acetyl-N-methyl)-aminopropyl]-5H - dibenzo[a,d]cycloheptene, 5-[3-(N-benzoyl-N-methyl)-aminopropyl] - 5H - dibenzo[a,d]cycloheptene and 5-[3-(N-phenylacetyl-N-methyl)-aminopropyl]-5H-dibenzo[a,d]cycloheptene.

*Example 7.—Preparation of 5-(3-methylaminopropyl)-5H-dibenzo[a,d]cycloheptene from 5-[3(N-formyl-N-methyl)-aminopropyl]-5H-dibenzo[a,d]cycloheptene*

29.5 g. of 5-[3-(N-formyl-N-methyl)-aminopropyl]-5H-dibenzo[a,d]cycloheptene is refluxed for 24 hours under nitrogen in a solution of 36.3 g. of potassium hydroxide in 378 ml. of n-butanol. After cooling to room temperature, the solvent is evaporated in vacuo, the residue is stirred with 200 ml. of water, 300 ml. of n-hexane, the layers separated, the water layer extracted with 100 ml. of n-hexane and the combined hexane layers washed with water (2 x 100 ml.) and then with 0.5 N sulfuric acid (100 x 80 x 80 ml.). The acid solution is then alkalized and extracted with ether (2 x 150 ml. and 1 x 100 ml.), dried over MgSO₄ and the solution evaporated to dryness yielding substantially pure 5-(3-methylaminopropyl)-5H-dibenzo[a,d]cycloheptene.

*Example 8*

Following the procedure of Example 7 and employing equivalent quantities of 5-[3-(N-acetyl-N-methyl)-aminopropyl]-5H-dibenzo[a,d]cycloheptene, 5-[3 - (N-benzoyl-N-methyl)-aminopropyl]-5H-dibenzo[a,d] - cycloheptene and 5-[3-(N-phenylacetyl-N-methyl)-aminopropyl] - 5H-dibenzo[a,d]cycloheptene, there is similarly obtained 5-(3-methylaminopropyl)-5H-dibenzo[a,d]cycloheptene.

We claim:

1. A compound of the structural formula

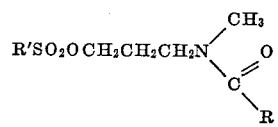

wherein R is sydrogen, lower alkyl, phenyl or benzyl and R′ is lower alkyl, phenyl, tolyl or benzyl.

2. 3-(N-formyl-N-methyl)-amino-1 - methanesulfonyloxypropane.

3. A process which comprises reacting 3-methyl-aminopropanol-1 with a compound of the structural formula

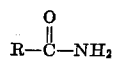

wherein R is hydrogen, alkyl, cycloalkyl, aralkyl or aryl to form the corresponding 3-(N-acyl-N-methyl)-aminopropanol-1 and then reacting said compound with a compound of the structural formula R'SO₂X, wherein R' is alkyl, cycloalkyl, aralkyl or aryl and X is bromine or chlorine to form a compound of the structural formula

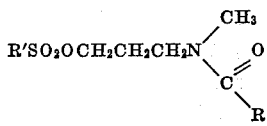

wherein R and R' are as defined.

References Cited by the Examiner

UNITED STATES PATENTS

| | | | |
|---|---|---|---|
| 2,816,125 | 12/1957 | Allen et al. | 260—456 |
| 2,825,726 | 3/1958 | Cope et al. | 260—456 |
| 3,075,899 | 1/1963 | Strauss et al. | 260—456 X |

OTHER REFERENCES

Wagner et al.: "Synthetic Organic Chemistry," page 568 (1953).

CHARLES B. PARKER, *Primary Examiner.*

JOSEPH P. BRUST, *Examiner.*

FLODY D. HIGEL, *Assistant Examiner.*

UNITED STATES PATENT OFFICE
CERTIFICATE OF CORRECTION

Patent No. 3,277,144                       October 4, 1966

Max Tishler et al.

It is hereby certified that error appears in the above numbered patent requiring correction and that the said Letters Patent should read as corrected below.

Column 1, line 45, the left-hand portion of the formula reading $(CH_2)_2N$ read $(CH_2)_3N$ line 70, for "(1962). Lithium" read -- (1962). The lithium --; column 2, line 5, for "derivatives" read -- derivative --; column 4, line 67, for "sydrogen" read -- hydrogen --.

Signed and sealed this 5th day of September 1967.

(SEAL)
Attest:

ERNEST W. SWIDER                       EDWARD J. BRENNER
Attesting Officer                          Commissioner of Patents